(12) United States Patent
Ozeki et al.

(10) Patent No.: US 10,458,562 B2
(45) Date of Patent: Oct. 29, 2019

(54) CONTROL VALVE

(71) Applicant: YAMADA MANUFACTURING CO., LTD., Kiryu-shi, Gunma (JP)

(72) Inventors: Akifumi Ozeki, Kiryu (JP); Toshihito Nagai, Kiryu (JP)

(73) Assignee: YAMADA MANUFACTURING CO., LTD., Kiryu-Shi (JP)

( * ) Notice: Subject to any disclaimer, the term of this patent is extended or adjusted under 35 U.S.C. 154(b) by 0 days.

(21) Appl. No.: 15/789,156

(22) Filed: Oct. 20, 2017

(65) Prior Publication Data

US 2018/0119836 A1 May 3, 2018

(30) Foreign Application Priority Data

Oct. 27, 2016 (JP) .................................. 2016-210707
May 18, 2017 (JP) .................................. 2017-098816

(51) Int. Cl.
*F16K 17/38* (2006.01)
*F01P 3/18* (2006.01)
(Continued)

(52) U.S. Cl.
CPC .............. *F16K 17/383* (2013.01); *F01P 3/18* (2013.01); *F01P 3/20* (2013.01); *F01P 7/16* (2013.01);
(Continued)

(58) Field of Classification Search
CPC .. F16K 17/383; F16K 11/085; F16K 11/0856; F16K 31/041; F01P 3/18; F01P 3/20; F01P 7/16
See application file for complete search history.

(56) References Cited

U.S. PATENT DOCUMENTS 6,164,331 A * 12/2000 Sugita ................. F16K 11/0743
137/625.43
6,539,899 B1 * 4/2003 Piccirilli ................. F01P 7/167
123/41.08
(Continued)

FOREIGN PATENT DOCUMENTS

EP  1860298 A2  11/2007
JP  2015-121207  7/2015
JP  2015-218852  12/2015

OTHER PUBLICATIONS

Japanese Office Action with English translation dated Aug. 28, 2018, 5 pages.
(Continued)

*Primary Examiner* — Eric Keasel
*Assistant Examiner* — Kevin R Barss
(74) *Attorney, Agent, or Firm* — Rankin, Hill & Clark LLP

(57) ABSTRACT

There is provided a control valve including a cylindrical casing having an inlet port and a first outlet port for a fluid, and a valve accommodated in the casing to be rotatable around an axis extending in an axial direction of the casing and having a flow path communicating with the inlet port to allow the fluid to flow therethrough, wherein a first communication port communicating with the flow path and the first outlet port according to a rotational position of the valve is formed in the valve, and a fail opening configured to be opened and closed by a thermostat is formed in a portion of the casing facing the inlet port in an opening direction of the inlet port.

6 Claims, 11 Drawing Sheets

(51) Int. Cl.
*F01P 3/20* (2006.01)
*F01P 7/16* (2006.01)
*F16K 11/085* (2006.01)
*F16K 31/04* (2006.01)
*F01P 7/14* (2006.01)
*F16K 27/10* (2006.01)

(52) U.S. Cl.
CPC ............ *F01P 7/165* (2013.01); *F16K 11/085* (2013.01); *F16K 11/0856* (2013.01); *F16K 31/041* (2013.01); *F01P 2007/146* (2013.01); *F01P 2031/00* (2013.01); *F01P 2060/02* (2013.01); *F01P 2060/04* (2013.01); *F01P 2060/08* (2013.01); *F01P 2060/12* (2013.01); *F01P 2060/16* (2013.01); *F01P 2060/18* (2013.01); *F16K 27/107* (2013.01)

(56) References Cited

U.S. PATENT DOCUMENTS

| | | | |
|---|---|---|---|
| 7,726,266 B2 * | 6/2010 | Komurian | F01P 7/165 123/41.08 |
| 9,115,634 B2 * | 8/2015 | Triebe | F01P 7/161 |
| 9,145,821 B2 * | 9/2015 | Lee | F01P 7/14 |
| 2003/0150923 A1 * | 8/2003 | Leu | F01P 7/167 236/34.5 |
| 2016/0273671 A1 * | 9/2016 | Chang | F01P 7/14 |
| 2017/0335749 A1 * | 11/2017 | Maruyama | F01P 7/16 |
| 2017/0362993 A1 * | 12/2017 | Seo | F01P 11/14 |
| 2018/0119827 A1 * | 5/2018 | Ozeki | F01P 5/12 |
| 2018/0119828 A1 * | 5/2018 | Ozeki | F16K 11/0856 |
| 2018/0313457 A1 * | 11/2018 | Shen | F16K 27/065 |
| 2018/0335153 A1 * | 11/2018 | Ozeki | F16K 11/0853 |

OTHER PUBLICATIONS

Certificate for Purpose of Seeking Application of Provision Concerning Exception to Lack of Novelty of Invention, Date of Exhibition: May 25, 2016, Automotive Engineering Exposition 2016 Yokohama, Pacifico Yokohama Exhibition Hall, 1-1, Minatomirai 1-chome, Nishi-ku, Yokohama-shi, Kanagawa, English translation included, 6 pages.

* cited by examiner

CONTROL VALVE

BACKGROUND OF THE INVENTION

Field of the Invention

The present invention relates to a control valve.

Priority is claimed on Japanese Patent Application No. 2016-210707, filed Oct. 27, 2016, and Japanese Patent Application No. 2017-098816, filed May 18, 2017, the content of which is incorporated herein by reference.

Description of Related Art

In a cooling system which cools an engine using cooling water, a bypass flow path which bypasses a radiator, a warming flow path which passes through an oil warmer, and so on may be provided separately from a radiator flow path which circulates between the radiator and the engine. In such a cooling system, there is provided a control valve for controlling a flow of the cooling water to the radiator flow path, the bypass flow path, the warming flow path and so on (for example, Japanese Unexamined Patent Application, First Publication No. 2015-121207).

According to such a configuration, by switching the flow of the cooling water according to a temperature of the cooling water or the like, it is possible to improve fuel efficiency by early temperature rise, high water temperature (optimal temperature) control, and so on.

For the above-described control valve, a configuration including a cylindrical casing having an inflow port for the cooling water and a cylindrical valve disposed coaxially with the casing in the casing and configured to be rotatable around an axis is known (for example, Japanese Unexamined Patent Application, First Publication No. 2015-218852).

An outlet port passing through the casing in a radial direction is formed in the casing. A plurality of outlet ports are formed at intervals in an axial direction of the casing.

A flow path through which the cooling water flowing into the casing flows in the axial direction is formed inside of the valve. A plurality of communication ports are formed in the valve. Each of the communication ports allows the flow path and each of the above-described outlet ports to communicate according to rotation of the valve.

According to such a configuration, communication and shut-off between the outlet port and the communication port are switched by rotating the valve. The cooling water flowing into the control valve flows out from the control valve through the outlet port communicating with the communication port while flowing through the flow path. Accordingly, the cooling water flowing into the control valve is distributed to one or a plurality of flow paths according to the rotation of the valve.

In the control valve, for example, there is the case in which a fail opening for supplying the cooling water to the radiator flow path when an abnormality occurs is formed in the casing. The fail opening is configured to be opened and closed by a thermostat. According to this configuration, when the temperature of the cooling water becomes a predetermined temperature or more, the thermostat opens the fail opening regardless of a rotational position of the valve.

However, according to an installation position of the thermostat in the casing, there is a possibility that the cooling water cannot be effectively delivered to the thermostat. Therefore, temperature sensing performance (responsiveness) of the thermostat may be degraded.

SUMMARY OF THE INVENTION

The present invention provides a control valve in which temperature sensing performance of a thermostat is able to be enhanced.

According to a first aspect of the present invention, there is provided a control valve including a cylindrical casing having an inlet port and a first outlet port for a fluid, and a valve accommodated in the casing to be rotatable around an axis extending in an axial direction of the casing and having a flow path communicating with the inlet port to allow the fluid to flow therethrough, wherein a first communication port communicating with the flow path and the first outlet port according to a rotational position of the valve is formed in the valve, and a fail opening configured to be opened and closed by a thermostat is formed in a portion of the casing facing the inlet port in an opening direction of the inlet port.

According to the first aspect, since the thermostat is disposed in the portion of the casing facing the inlet port in the opening direction of the inflow port, it is possible to effectively deliver the fluid flowing into the casing to the thermostat. Therefore, temperature sensing performance of the thermostat can be improved. As a result, the fail opening can be promptly opened and closed according to a temperature of the fluid temperature regardless of a rotational position of the valve (regardless of a communication state between the first outlet port and the first communication port).

According to a second aspect of the present invention, a second outlet port configured to open in a direction intersecting the opening direction of the fail opening may be formed in a portion of the casing adjacent to the fail opening.

According to the second aspect, the fluid flowing into the casing through the inlet port is in contact with the thermostat and then flows out to outside of the casing through the second outlet port. Therefore, since it is possible to create a flow toward the second outlet port around the thermostat in the casing, formation of a stagnation point around the thermostat can be prevented. Accordingly, the temperature sensing performance of the thermostat can be further improved.

According to a third aspect of the present invention, the casing may include a bottomed cylindrical casing main body and a cover body configured to close an opening of the casing main body, the fail opening may pass radially through a portion of the casing main body located close to the cover body in the axial direction, the second outlet port may pass through the cover body in the axial direction, and a first joint which connects a heat exchanger disposed outside the casing to the second outlet port may be integrally formed with the cover body.

According to the third aspect, since a connecting pipe connecting the heat exchanger and the control valve is formed integrally with the cover body, the number of components can be reduced, and installation processing can be reduced as compared with the case in which the connecting pipe is separately installed (welding or the like) in the casing main body or the cover body.

According to a fourth aspect of the present invention, the valve may include a rotating shaft rotatably supported by the casing and a valve cylinder portion configured to surround the rotating shaft in a part of an axial direction, configured to partition and define the flow path between the valve cylinder portion and the rotating shaft and in which a first communication port is formed, a connection flow path configured to allow the inlet port and the flow path to communicate with each other may be formed at a position in the casing which avoids the valve cylinder portion in the axial direction, and the second outlet port may directly communicate with the connection flow path.

According to the fourth aspect, the fluid flowing out from the second outlet port flows into the connection flow path and then flows into the second outlet port without passing through the flow path. That is, the fluid always flows into the second outlet port regardless of the rotational position of the valve. Therefore, for example, when communication between the first outlet port and the first communication port is blocked (when the valve is fully closed), the flow of the fluid from the connection flow path to the flow path is weakened. Therefore, when the valve is fully closed, contaminants entering the casing can be prevented from flowing toward the valve, and the contaminants can be actively discharged from the second outlet. Accordingly, it is possible to prevent contaminants entering between an outer circumferential surface of the valve and an inner circumferential surface of the casing and thus to prevent rotation of the valve from being hindered.

According to a fifth aspect of the present invention, the valve may include a rotating shaft of which both ends in the axial direction are rotatably supported by the casing via a bearing and a valve cylinder portion configured to surround the rotating shaft, configured to partition and define the flow path between the valve cylinder portion and the rotating shaft and in which the first communication port is formed, a seal ring may be disposed between a portion of the casing located axially inward with respect to the bearing and the rotating shaft, and an atmosphere opening portion which opens a portion of the seal ring positioned outside in the axial direction to the atmosphere may be formed in the casing.

According to the fifth aspect, since both ends of the rotating shaft in the axial direction are open to the atmosphere, a pressure difference is not generated in pressures acting on both ends of the rotating shaft. Therefore, it is easy to set a uniform axial load to act on the rotating shaft as compared with the case in which the pressures acting on both ends of the rotating shaft are different from each other, for example, as in a configuration in which one end of the rotating shaft is disposed in the cooling water. Accordingly, it is possible to minimize pressing of the rotating shaft toward a low pressure side in the axial direction.

According to a sixth aspect of the present invention, the first outlet port and the fail opening may be formed side by side in the casing, and an outer surface of the casing may have a welding portion which surrounds the first outlet port and the fail opening and on which a joint collectively communicating with the first outlet port and the fail opening is welded.

According to the sixth aspect, since the joint collectively communicates with the first outlet port and the fail opening, it is possible to reduce the number of components and to remove a welding process as compared with the case in which separate joints are welded to the first outlet port and the fail opening. It is possible to reduce a welding margin for the joint at a portion located between the first outlet port and the fail opening as compared with the case in which separate joints are welded to the first outlet port and the fail opening. Accordingly, it is possible to reduce a size of the control valve in an arrangement direction of the first outlet port and the fail opening.

Also, in the sixth aspect, since the outlet port is formed at a position facing the fail opening, an opening end surface of the outlet port can serve as a seating surface at the time of joint welding. Therefore, the welding operation can be effectively performed.

According to a seventh aspect of the present invention, the second joint may be connected to a radiator of a vehicle.

According to the seventh aspect, when a temperature of the fluid reaches a predetermined temperature or more, the fluid can be supplied to the radiator through the fail opening. Therefore, the temperature of the fluid can be promptly reduced to less than the predetermined temperature.

According to the above-described control valve, it is possible to enhance temperature sensing performance of the thermostat.

DETAILED DESCRIPTION OF EMBODIMENTS

Next, an embodiment of the present invention will be described on the basis of the drawings. In the following description, a case in which a control valve of the present embodiment is adopted in a cooling system which cools an engine using cooling water will be described.

[Cooling System]

Figure 1:
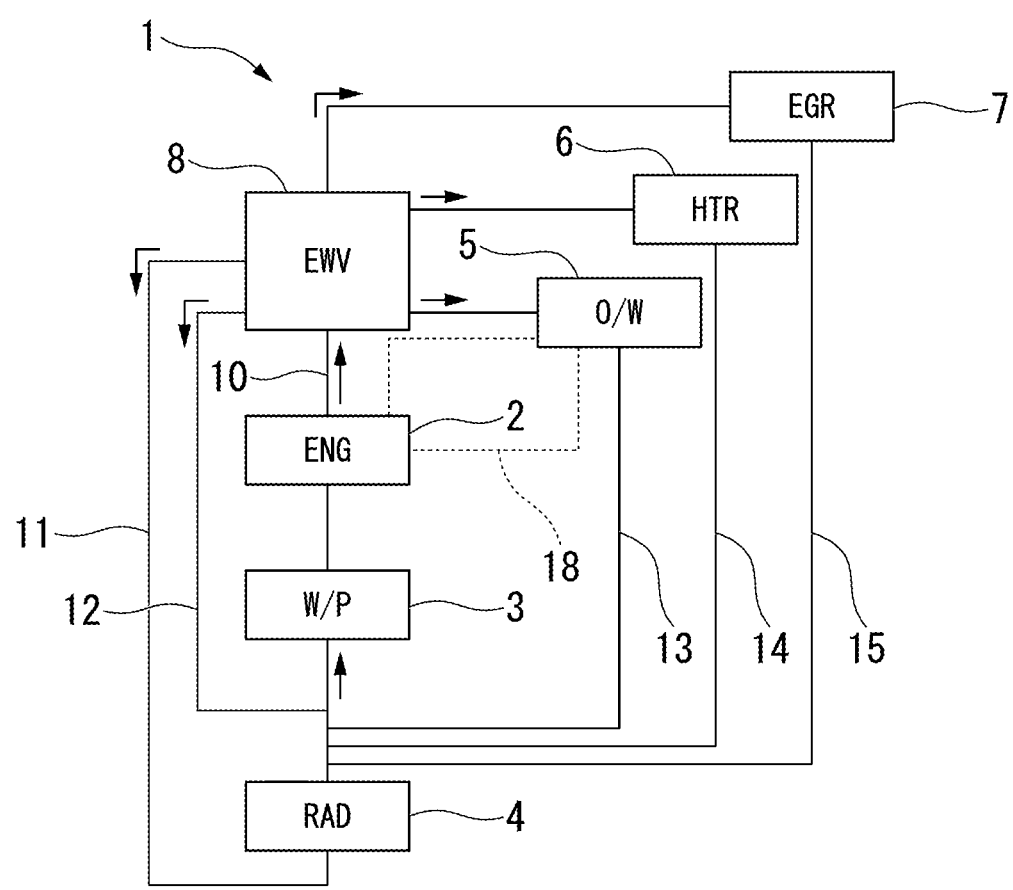
FIG. 1 is a block diagram of a cooling system according to an embodiment.

FIG. 1 is a block diagram of a cooling system 1.

As illustrated in FIG. 1, the cooling system 1 is mounted in a vehicle having at least an engine as a vehicle driving source. Also, in addition to a vehicle having only an engine, a hybrid vehicle, a plug-in hybrid vehicle, or the like may be used as the vehicle.

The cooling system 1 includes an engine (ENG) 2, a water pump (W/P) 3, a radiator (RAD) 4, an oil warmer (O/W) 5, a heater core (HTR) 6, an EGR cooler (EGR) 7, and a control valve (EWV) 8 which are connected through various flow paths 10 to 15.

The water pump 3, the engine 2 and the control valve 8 are connected, in turn, from upstream to downstream on a main flow path 10. In the main flow path 10, the cooling water passes through the engine 2 and the control valve 8, in turn, due to an operation of the water pump 3.

A radiator flow path 11, a bypass flow path 12, a warming flow path 13, an air-conditioning flow path 14 and an EGR flow path 15 are respectively connected to the main flow path 10. The radiator flow path 11, the bypass flow path 12, the warming flow path 13, the air-conditioning flow path 14 and the EGR flow path 15 connect an upstream portion of the water pump 3 in the main flow path 10 with the control valve 8.

The radiator 4 is connected to the radiator flow path 11. In the radiator flow path 11, heat exchange between the cooling water and external air is performed in the radiator 4.

The bypass flow path 12 is a flow path which bypasses the radiator 4.

The oil warmer 5 is connected to the warming flow path 13. Engine oil circulates through an oil flow path 18 between the oil warmer 5 and the engine 2. In the warming flow path 13, heat exchange between the cooling water and the engine oil is performed in the oil warmer 5. Further, in the embodiment, a heat exchanger is used as the "oil warmer 5" in view of improvement of fuel economy and early warm-up, but an oil temperature may be higher than a water temperature according to operating conditions. When the oil temperature is higher than the water temperature, the heat exchanger is used as an "oil cooler".

The heater core 6 is connected to the air-conditioning flow path 14. The heater core 6 is provided, for example, in a duct (not illustrated) of an air conditioner. In the air-conditioning flow path 14, heat exchange between the cooling water and conditioned air flowing through the duct is performed in the heater core 6.

The EGR cooler 7 is connected to the EGR flow path 15. In the EGR flow path 15, heat exchange between the cooling water and an EGR gas is performed in the EGR cooler 7. Further, in addition to the EGR cooler 7, an EGR valve, a turbocharger, a throttle, and so on are connected in series to the EGR flow path 15. Heat exchange is performed in each device (the EGR valve or the turbocharger, the throttle, and so on) including the EGR cooler 7. Therefore, the EGR cooler 7, the EGR valve, the turbocharger, the throttle and so on can be regarded as heat exchangers.

In the cooling system 1 described above, the cooling water having passed through the engine 2 in the main flow path 10 flows into the control valve 8 and is then selectively distributed to the various flow path 11 to 15 by the operation of the control valve 8. Therefore, early temperature rise, high water temperature (optimal temperature) control or the like can be realized, and improvement of the fuel economy in the vehicle is promoted.

First Embodiment

<Control Valve>

Figure 2:
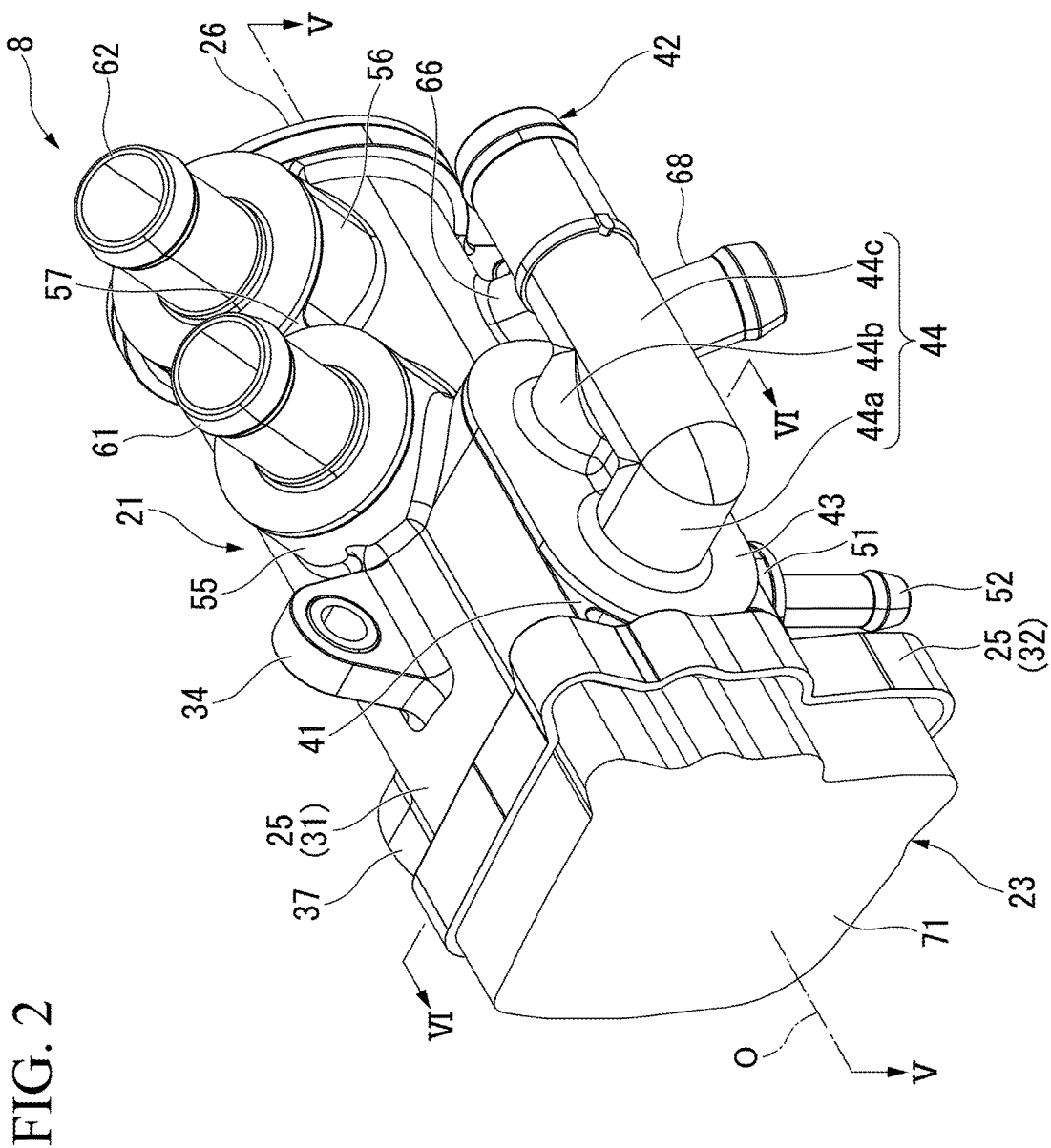
FIG. 2 is a perspective view of a control valve according to a first embodiment.
Figure 3:
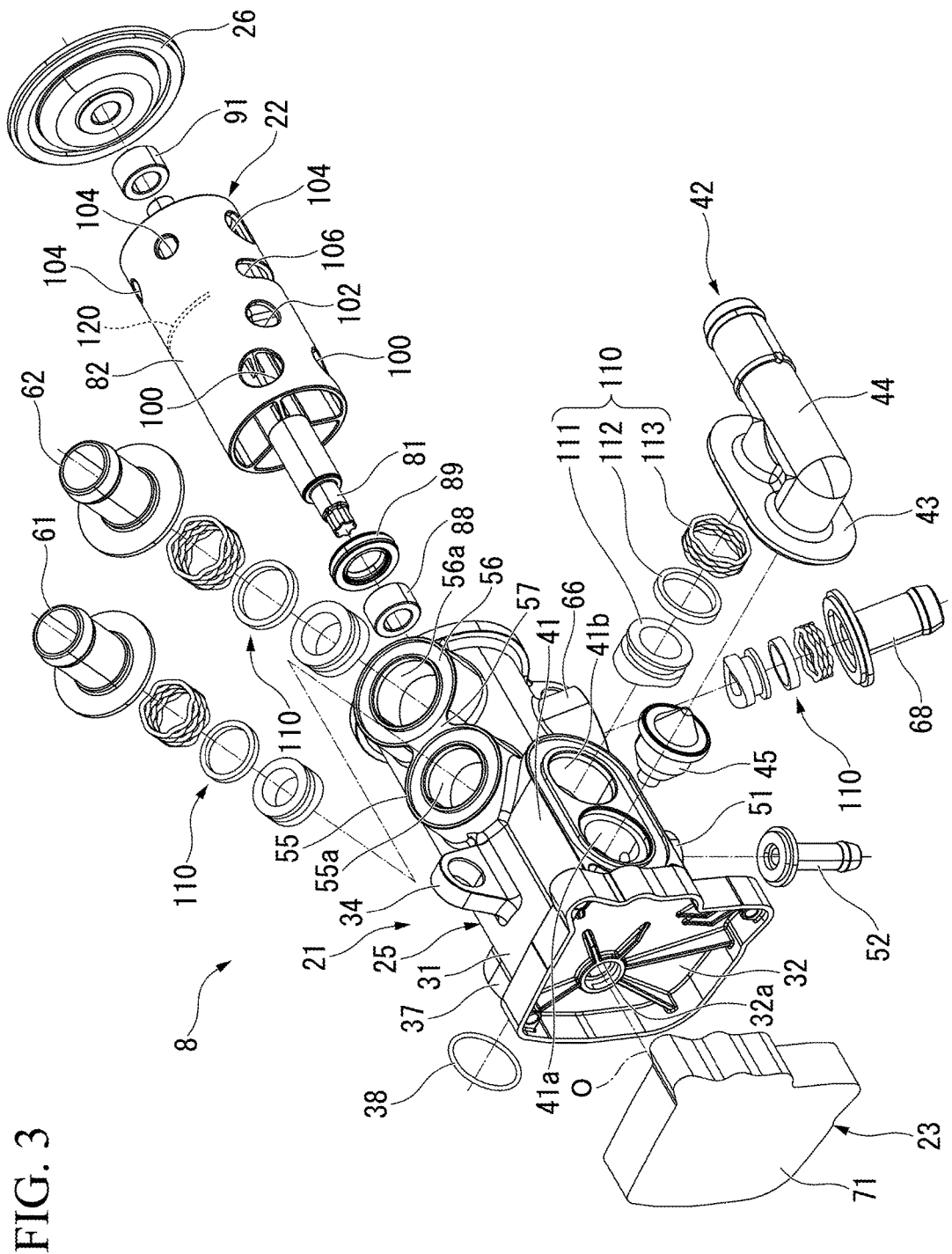
FIG. 3 is an exploded perspective view of the control valve according to the first embodiment.

FIG. 2 is a perspective view of the control valve 8. FIG. 3 is an exploded perspective view of the control valve 8.

As illustrated in FIGS. 2 and 3, the control valve 8 mainly includes a casing 21, a valve 22 and a drive unit 23.

(Casing)

The casing 21 has a bottomed cylindrical casing main body 25 and a cover body 26 which closes an opening of the casing main body 25. Further, in the following description, a direction along an axis O of the casing 21 is simply referred to as an axial direction. With respect to a circumferential wall portion 31 of the casing main body 25, a direction toward a bottom wall portion 32 of the casing main body 25 is referred to as a first end side, and with respect to the circumferential wall portion 31 of the casing main body 25, a direction toward the cover body 26 is referred to as a second side. A direction orthogonal to the axis O is referred to as a radial direction, and a direction around the axis O is referred to as a circumferential direction. In the embodiment, a surface area of the circumferential wall portion 31 is formed to be larger than that of the bottom wall portion 32 or the cover body 26. That is, the casing 21 is formed in a cylindrical shape which is long in the axial direction.

Figure 4:
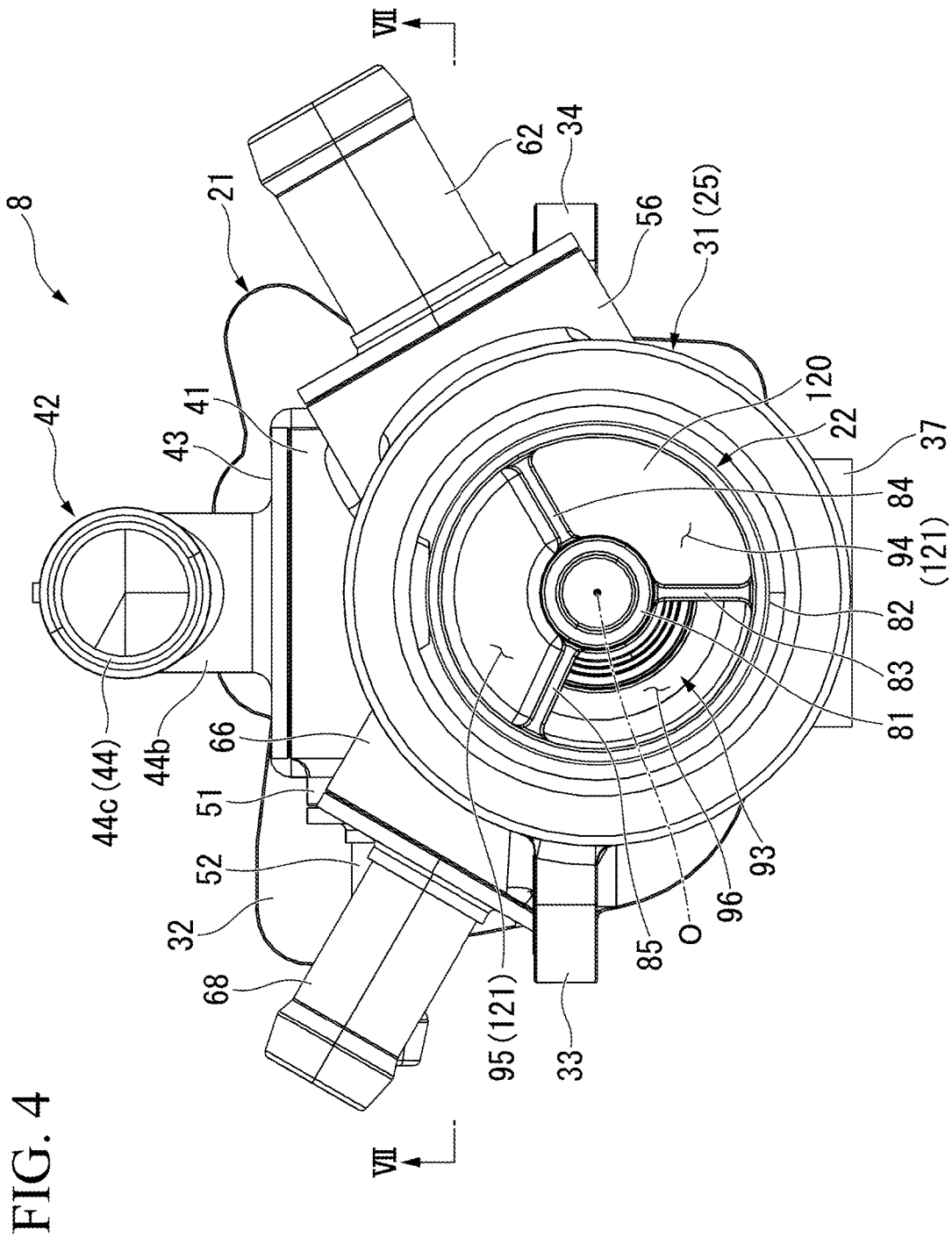
FIG. 4 is a front view of the control valve according to the first embodiment as seen from a second end side in an axial direction while a cover body is removed.

FIG. 4 is a front view of the control valve 8 as seen from the second end side in the axial direction while the cover body 26 is removed.

The casing main body 25 and the cover body 26 illustrated in FIG. 4 are formed of, for example, a resin material or the like.

Installation pieces (a first installation piece 33 and a second installation piece 34) are formed on the circumferential wall portion 31 of the casing main body 25. Each of the installation pieces 33 and 34 protrudes radially outward from the circumferential wall portion 31. The installation pieces 33 and 34 are formed at positions facing each other in the radial direction having the axis O of the circumferential wall portion 31 therebetween. In the embodiment, first installation pieces 33 are located at both axial ends of the circumferential wall portion 31 (refer to FIG. 7). As illustrated in FIG. 2, the second installation piece 34 is located on the first end side with respect to a center portion in the axial direction of the circumferential wall portion 31. The control valve 8 is fixed in an engine space using, for example, each of the installation pieces 33 and 34. Further, the position, the number and so on of each of the installation pieces 33 and 34 can be appropriately changed.

Figure 5:
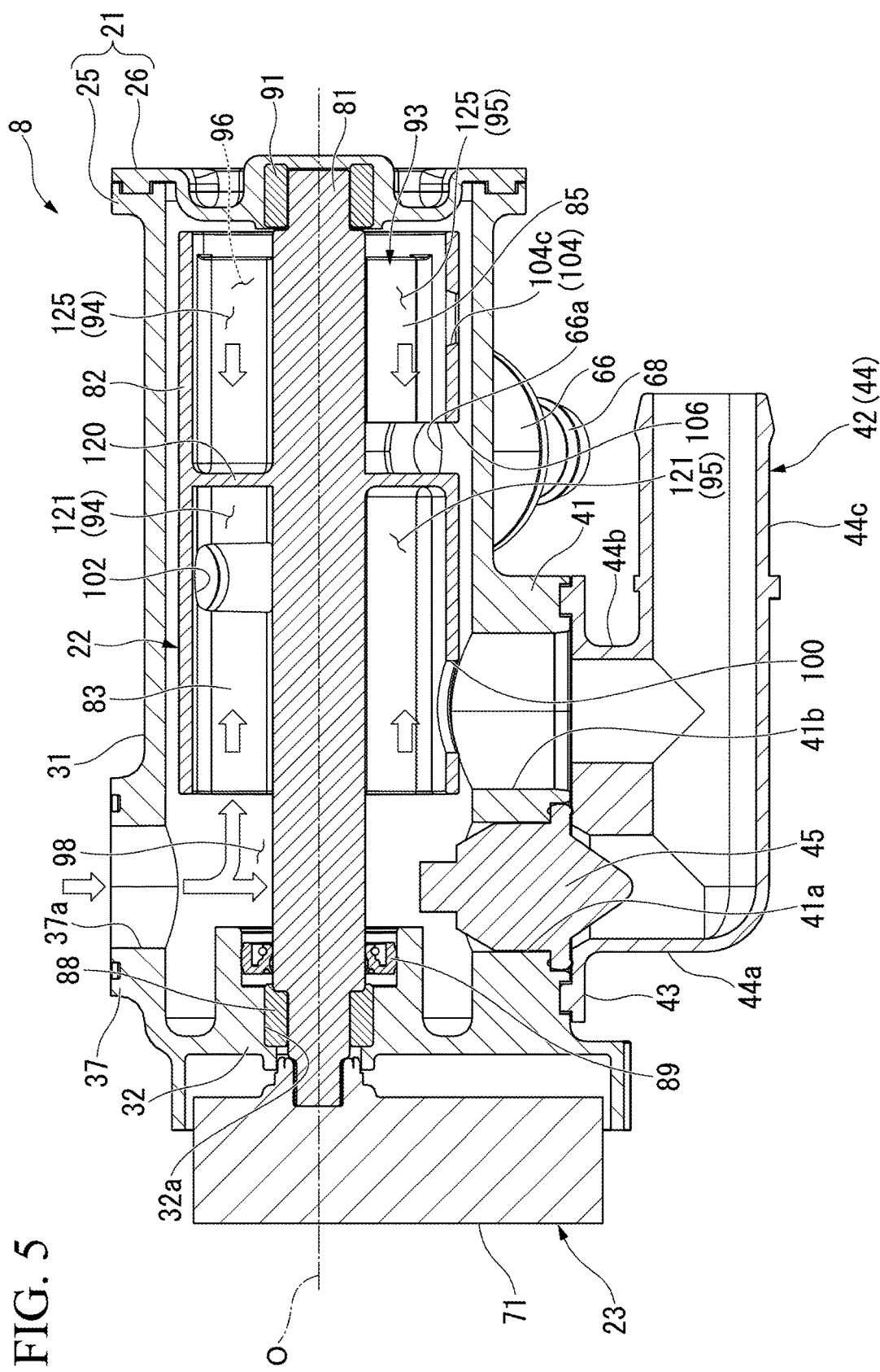
FIG. 5 is a cross-sectional view taken along line V-V of FIG. 2.

FIG. 5 is a cross-sectional view taken along line V-V of FIG. 2.

As illustrated in FIGS. 4 and 5, an inflow port 37 extending outward in the radial direction is formed in a portion of the circumferential wall portion 31 on the first end side in the axial direction. The inflow port 37 is formed at a position on the circumferential wall portion 31 which deviates from the installation pieces 33 and 34 by, for example, 90° in a circumferential direction. An inlet port 37a which passes through the inflow port 37 in the radial direction is formed in the inflow port 37. The inlet port 37a allows an inside and an outside of the casing 21 to communicate.

The above-described main flow path 10 (refer to FIG. 1) is connected to an opening end surface (radially outer end surface) of the inflow port 37 having an O-ring 38 therebetween (refer to FIG. 3). Further, the opening end surface of the inflow port 37 is formed as a flat surface orthogonal to the radial direction.

As illustrated in FIG. 5, a radiator port 41 extending outward in the radial direction is formed at a position on the circumferential wall portion 31 which faces the inflow port 37 in the radial direction having the axis O therebetween. The radiator port 41 is formed in an elliptical shape of which a long-length direction is the axial direction in a side view when seen from the radial direction. In the radiator port 41, a fail opening 41a and a radiator outlet port 41b are formed side by side in the axial direction. The fail opening 41a and the radiator outlet port 41b respectively pass through the radiator port 41 in the radial direction. In the embodiment, the fail opening 41a faces the above-described inlet port 37a in the radial direction. The radiator outlet port 41b is located on the second end side of the fail opening 41a in the axial direction. Further, an inner diameter of each of the fail opening 41a and the radiator outlet port 41b are formed to be equal.

An opening end surface (radially outer end surface) of the radiator port 41 is a flat surface orthogonal to the radial direction. Therefore, the opening end surface of the radiator port 41 and the above-described opening end surface of the inflow port 37 extend in parallel to each other. However, as long as the radiator port 41 and the inflow port 37 are disposed at positions which face each other in the radial direction, the opening end surface of the radiator port 41 and the opening end surface of the inflow port 37 may be disposed to be slightly inclined with respect to each other.

A radiator joint 42 is connected to the opening end surface (radially outer end surface) of the radiator port 41. The radiator joint 42 connects the radiator port 41 and the radiator flow path 11 (refer to FIG. 1). The radiator joint 42 has a flange portion 43 and a radiator supply pipe 44.

The flange portion 43 has an elliptical shape which is formed in the same shape as the opening end surface of the radiator port 41. That is, the flange portion 43 surrounds the fail opening 41a and the radiator outlet port 41b. The flange portion 43 is welded (for example, vibration welding or the like) to the opening end surface of the radiator port 41. That is, the opening end surface of the radiator port 41 and a radially inner end surface of the flange portion 43 are welded surfaces, respectively.

The radiator supply pipe 44 extends outward from the flange portion 43 in the radial direction and then extends toward the second end side in the axial direction. Specifically, the radiator supply pipe 44 includes a fail communication portion 44a, a radiator communication portion 44b, and a merging portion 44c.

The fail communication portion 44a extends radially outward from a position on the flange portion 43 overlapping with the fail opening 41a as seen in the radial direction. An inside of the fail communication portion 44a is capable of communicating with the fail opening 41a.

The radiator communication portion 44b extends radially outward from a position on the flange portion 43 overlapping with the radiator outlet port 41b as seen in the radial direction. An inside of the radiator communication portion 44b communicates with the radiator outlet port 41b.

The merging portion 44c extends in the axial direction. A portion of the merging portion 44c on the first end side in the axial direction is collectively connected to a radially outer end of each of the communication portions 44a and 44b. An upstream end of the above-described radiator flow path 11 (refer to FIG. 1) is connected to a portion of the merging portion 44c on the second end side in the axial direction. Further, the radiator supply pipe 44 may collectively communicate with the fail opening 41a and the radiator outlet port 41b as long as a welding area between the radiator port 41 and the flange portion 43 is secured.

A thermostat 45 is provided in the fail opening 41a. The thermostat 45 opens and closes the fail opening 41a according to a temperature of the cooling water flowing in the casing 21. When the temperature of the cooling water is equal to or higher than a predetermined temperature, the thermostat 45 opens the fail opening 41a and allows the fail opening 41a and the inside of the fail communication portion 44a to communicate with each other. In the embodiment, for example, the thermostat 45 is of a wax pellet type. That is, in the thermostat 45, a valve body is operated using thermal expansion of a wax filled into a thermo-element. The thermostat 45 closes the fail opening 41a with the valve body by that a mounted flange portion is interposed between the opening end surface of the radiator port 41 and the flange portion 43. The thermo-element of the thermostat 45 faces the inlet port 37a in the casing 21 in the radial direction. Further, in the embodiment, the configuration in which the fail opening 41a and the inlet port 37a are coaxially arranged has been described. However, embodiments of the present invention is not limited to this configuration, and at least a part of the fail opening 41a and the inlet port 37a may overlap with each other when seen from the radial direction.

Figure 6:
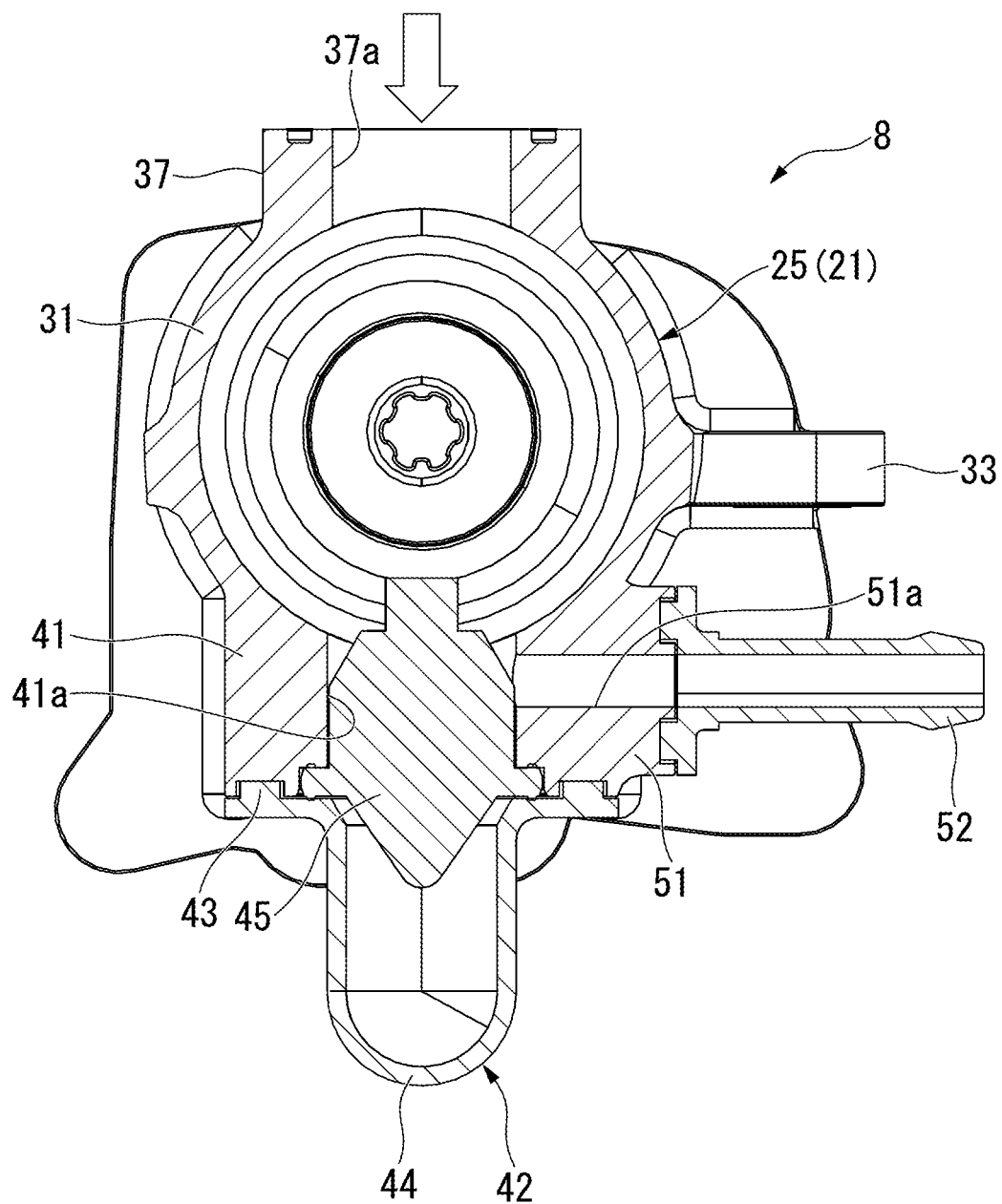
FIG. 6 is a cross-sectional view taken along line VI-VI of FIG. 2.

FIG. 6 is a cross-sectional view taken along line VI-VI in FIG. 2.

As illustrated in FIG. 6, an EGR port 51 is formed at a position on the radiator port 41 which is equivalent to that of the above-described fail opening 41a in the axial direction. The EGR port 51 bulges in a direction orthogonal to an opening direction of the fail opening 41a (the same direction as that of the first installation piece 33). An EGR outlet port 51a communicating with the inside of the radiator port 41 (the fail opening 41a) is formed in the EGR port 51. The EGR outlet port 51a extends in a bulging direction of the EGR port 51 (the direction orthogonal to the opening direction of the fail opening 41a). Further, an opening direction of the EGR outlet port 51a may be opening in a direction crossing the opening direction of the fail opening 41a (direction different from the opening direction of the fail opening 41a). The EGR port 51 (EGR outlet port 51a) may be located at a position which axially deviates from the fail opening 41a as long as it is adjacent to the fail opening 41a.

An EGR joint 52 is connected to the opening end surface of the EGR port 51. The EGR joint 52 connects the EGR port 51 and an upstream end of the above-described EGR flow path 15 (refer to FIG. 1). Also, the EGR joint 52 is welded (for example, vibration welding or the like) to the opening end surface of the EGR port 51.

As illustrated in FIG. 2, a bypass port 55 and a warming port 56 are formed in a portion of the circumferential wall portion 31 on the second end side in the axial direction located between the radiator port 41 and the second installation piece 34 in the circumferential direction. The bypass port 55 and the warming port 56 are formed side by side in the axial direction. Each of the ports 55 and 56 bulges in a direction of the radial direction intersecting each other in the bulging direction of the radiator port 41 and the second installation piece 34 (direction of the radial direction different from the extending direction of each of the radiator port 41 and the second installation piece 34). A connecting portion 57 which connects the ports 55 and 56 in the axial direction is formed at a portion of the circumferential wall portion 31 between the ports 55 and 56. A width of the connecting portion 57 in the circumferential direction is formed to be narrower than that of each of the ports 55 and 56, and a radially outward bulging amount is equal to that of each of the ports 55 and 56.

Figure 7:
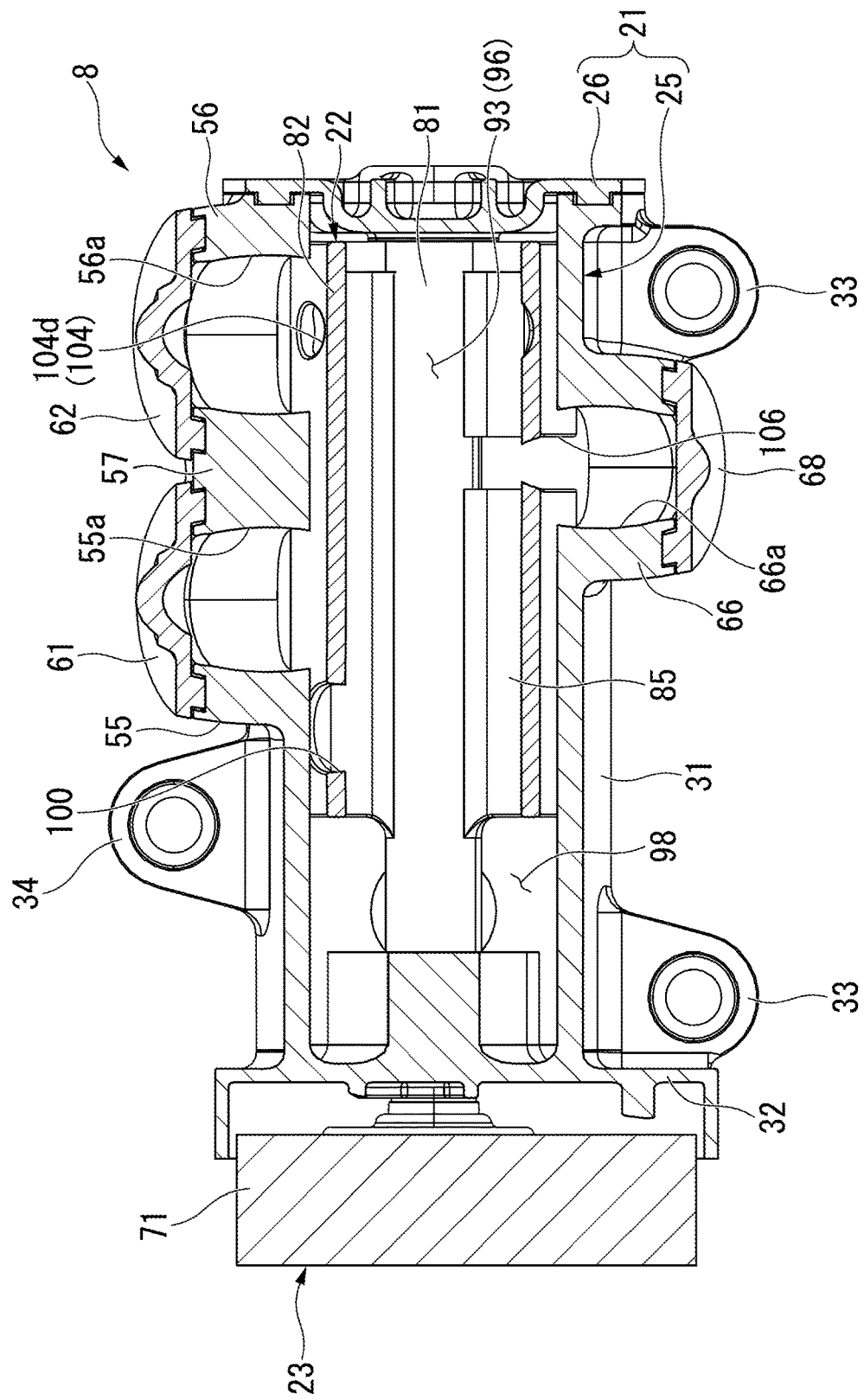
FIG. 7 is a cross-sectional view taken along line VII-VII of FIG. 4.

FIG. 7 is a cross-sectional view taken along line VII-VII of FIG. 4.

As illustrated in FIG. 7, the bypass port 55 is disposed on the first end side in the axial direction of the warming port 56. A bypass outlet port 55a passing through the bypass port 55 in the radial direction is formed in the bypass port 55. As illustrated in FIG. 2, a bypass joint 61 is connected to the opening end surface (radially outer end surface) of the bypass port 55. The bypass joint 61 connects the bypass port 55 and an upstream end of the above-described bypass flow path 12 (refer to FIG. 1). The bypass joint 61 protrudes radially outward from an opening end surface of the bypass port 55. Further, the bypass joint 61 is welded (for example, vibration welding or the like) to the opening end surface of the bypass port 55.

As illustrated in FIG. 7, a warming outlet port 56*a* passing through the warming port 56 in the radial direction is formed at the warming port 56. A warming joint 62 is connected to an opening end surface (radially outer end surface) of the warming port 56. As illustrated in FIG. 2, the warming joint 62 connects the warming port 56 and an upstream end of the above-described warming flow path 13 (refer to FIG. 1). The warming joint 62 protrudes radially outward from the opening end surface of the warming port 56. The warming joint 62 is welded (for example, vibration welding or the like) to the opening end surface of the warming port 56. Further, the bypass port 55 and the warming port 56 may be disposed to be displaced from each other in the circumferential direction.

As illustrated in FIG. 4, an air-conditioning port 66 is formed in a portion of the circumferential wall portion 31 on the second end side in the axial direction which is located between the radiator port 41 and the first installation piece 33 in the circumferential direction. The air-conditioning port 66 bulges in a direction of the radial direction (direction of the radial direction different from the bulging direction of each of the radiator port 41 and the first installation piece 33) intersecting each other in the bulging direction of the radiator port 41 and the first installation piece 33. As illustrated in FIG. 7, the air-conditioning port 66 is formed between the above-described bypass port 55 and the warming port 56 in the axial direction. In the embodiment, a center portion of the air conditioning port 66 in the axial direction and a center portion of the above-described connecting portion 57 in the axial direction are disposed at the same position in the axial direction. An outer diameter of the air-conditioning port 66 is formed to be larger than a distance between the bypass outlet port 55*a* and the warming outlet port 56*a* in the axial direction.

An air conditioning outlet port 66*a* passing through the air-conditioning port 66 in the radial direction is formed in the air conditioning port 66. In the embodiment, an inner diameter of the air-conditioning outlet port 66*a* is formed to be equal to an axial width (interval between the bypass outlet port 55*a* and the warming outlet port 56*a*) of the above-described connecting portion 57. However, the inner diameter of the air-conditioning outlet port 66*a* can be appropriately changed.

As illustrated in FIG. 4, an air-conditioning joint 68 is connected to an opening end surface (radially outer end surface) of the air conditioning port 66. The air-conditioning joint 68 connects the air-conditioning port 66 and an upstream end of the above-described air-conditioning flow path 14 (refer to FIG. 1). The air-conditioning joint 68 protrudes radially outward from the opening end surface of the air conditioning port 66. Further, the air-conditioning joint 68 is welded (for example, vibration welding, or the like) to the opening end surface of the air conditioning port 66.

(Drive Unit)

As illustrated in FIG. 2, the drive unit 23 is installed on the bottom wall portion 32 of the casing main body 25. The drive unit 23 is configured by accommodating a motor, a speed reduction mechanism, a control board, and so on, which are not illustrated, in a drive case 71.

(Valve)

As illustrated in FIGS. 3 and 4, the valve 22 is accommodated in the casing 21. The valve 22 is formed in a cylindrical shape disposed coaxially with the axis O of the casing 21. By rotating around the axis O, the valve 22 opens and closes each of the above-described outlet ports (the radiator outlet port 41*b*, the bypass outlet port 55*a*, the warming outlet port 56*a*, and the air-conditioning outlet port 66*a*). Further, the valve 22 is formed of, for example, a resin material or the like.

The valve 22 mainly includes a rotating shaft 81, a hollow cylindrical valve cylinder portion 82 which surrounds the rotating shaft 81, and spoke portions 83 to 85 which connect the rotating shaft 81 and the valve cylinder portion 82.

As illustrated in FIG. 5, the rotating shaft 81 extends coaxially with the axis O. A portion of the rotating shaft 81 on the first end side is rotatably supported by a first bush 88 provided on the above-described bottom wall portion 32. The first bush 88 is fitted into a through-hole 32*a* passing through the bottom wall portion 32 in the axial direction. A portion of the rotating shaft 81 on the first end side passes through the bottom wall portion 32 in the axial direction via the through-hole 32*a*. The portion of the rotating shaft 81 on the first end side is connected to the above-described drive unit 23 outside the casing 21. Therefore, power of the drive unit 23 is transmitted to the rotating shaft 81. Further, as illustrated in FIG. 3, a seal ring 89 which seals between an inner surface of the through-hole 32*a* and an outer circumferential surface of the rotating shaft 81 is provided to the rotating shaft 81 on the first end side at the portion which is located on the second end side in the axial direction with respect to the above-described first bush 88.

A portion of the rotating shaft 81 on the second end side is rotatably supported by a second bush 91 provided on the above-mentioned cover body 26.

Figure 8:
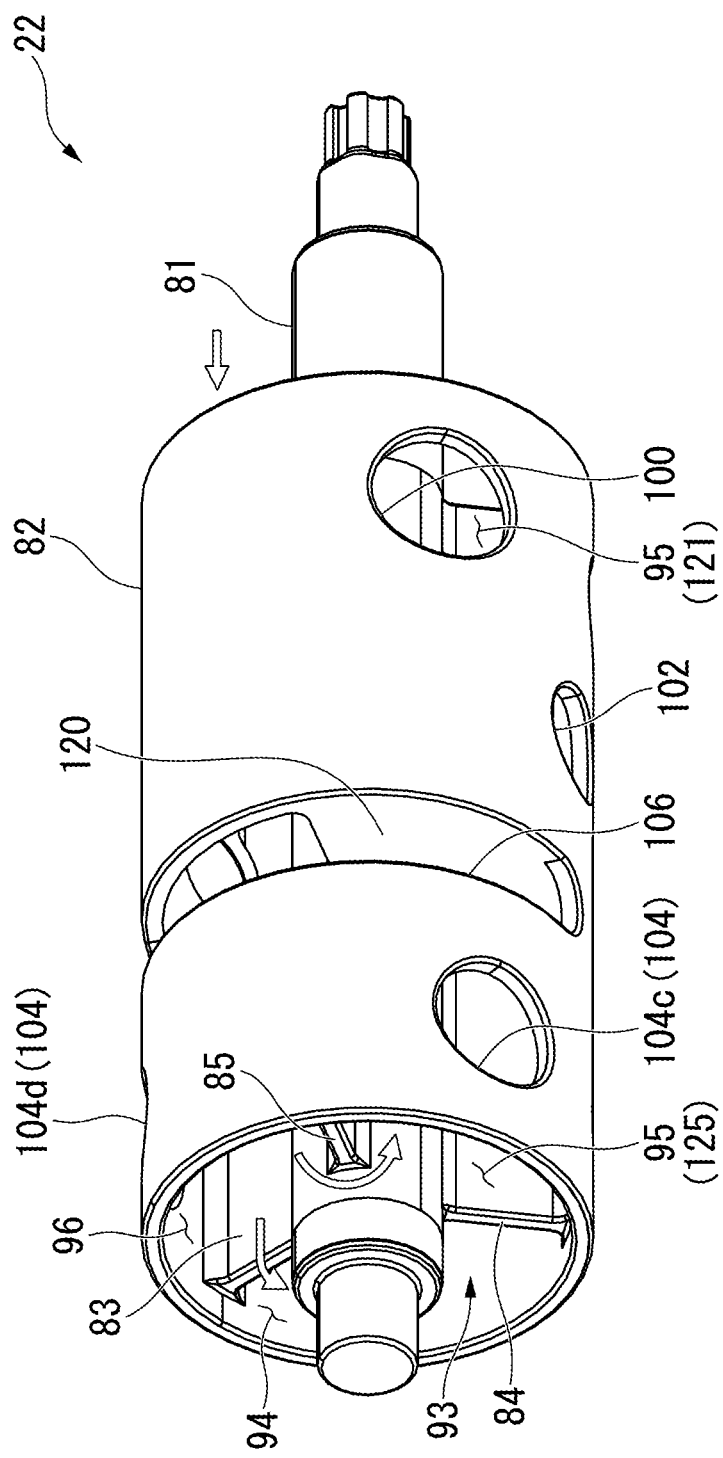
FIG. 8 is a perspective view of the valve according to the first embodiment as seen from the second end side in the axial direction.

FIG. 8 is a perspective view of the valve 22 as seen from the second end side in the axial direction.

As illustrated in FIG. 8, the spoke portions 83 to 85 protrude radially from the outer circumferential surface of the rotating shaft 81 with respect to the axis O. In the embodiment, three spoke portions 83 to 85 (a first spoke portion 83, a second spoke portion 84, and a third spoke portion 85) are formed, for example, at intervals of 120° in the circumferential direction.

As illustrated in FIGS. 5, 7 and 8, each of the spoke portions 83 to 85 extends axially from a portion of the rotation shaft 81 except both ends thereof in the axial direction. In the embodiment, edges of the spoke portions 83 to 85 on the first end side in the axial direction are located at a position which is closer to the second end side in the axial direction in relation to the fail opening 41*a* and is closer to the first end side in the axial direction in relation to the radiator outlet port 41*b*.

The valve cylinder portion 82 is disposed coaxially with the axis O. Radially outer ends of the spoke portions 83 to 85 are connected to an inner circumferential surface of the valve cylinder portion 82. An inside of the valve cylinder portion 82 configures a flow path 93 through which the cooling water flowing into the casing 21 through the inlet port 37*a* flows in the axial direction. As illustrated in FIGS. 4 and 8, the flow path 93 is divided into a plurality of flow paths (a first flow path 94, a second flow path 95 and a third flow path 96) in the circumferential direction by the above-described spoke portions 83 to 85. Specifically, the first flow path 94 is partitioned off in the circumferential direction by the first spoke portion 83 and the second spoke portion 84. The second flow path 95 is partitioned off in the circumferential direction by the second spoke portion 84 and the third spoke portion 85. The third flow path 96 is partitioned of in the circumferential direction by the first spoke portion 83 and the third spoke portion 85. In addition, as illustrated in FIG. 5, a portion (position avoiding the valve cylinder portion 82 in the axial direction) of the casing 21 which is located on the first end side in the axial direction in relation to the valve cylinder portion 82 and the spoke portions 83 to 85 configures a connection flow path 98 communicating with the flow path 93.

Figure 9:
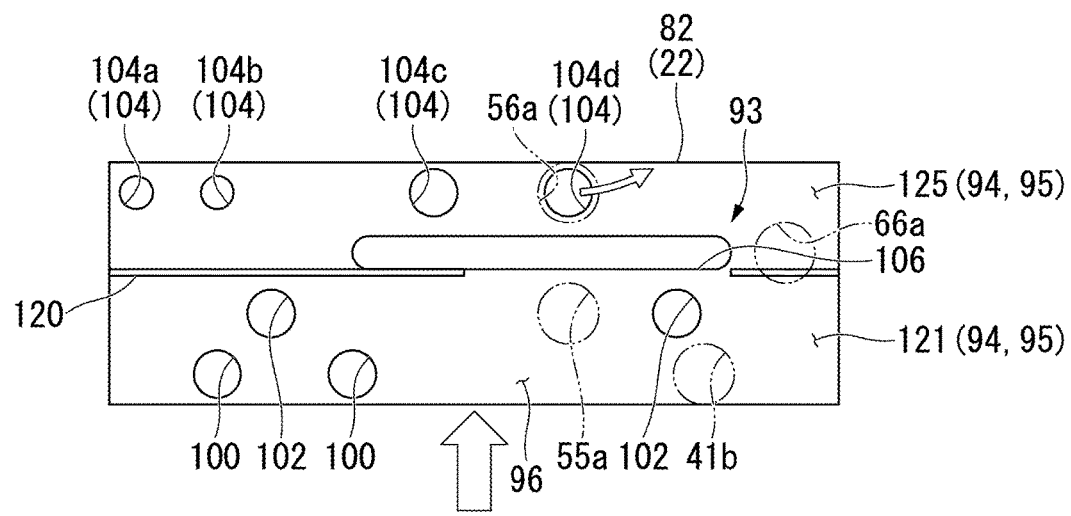
FIG. 9 is a developed view of a valve cylinder portion according to the first embodiment.

FIG. 9 is a developed view of the valve cylinder portion 82.

As illustrated in FIGS. 8 and 9, in the valve cylinder portion 82, a radiator communication port 100 passing through the valve cylinder portion 82 in the radial direction is formed at the same position as that of the above-described radiator outlet port 41b in the axial direction. When at least a part of the radiator communication port 100 overlaps with the radiator outlet port 41b as seen from the radial direction, the radiator communication port 100 communicates the radiator outlet port 41b and an inside of the flow path 93 through the radiator communication port 100. In the embodiment, the radiator communication port 100 is formed as a round hole. For example, two radiator communication ports 100 are formed at intervals in the circumferential direction.

In the valve cylinder portion 82, a bypass communication port 102 passing through the valve cylinder portion 82 in the radial direction is formed at the same position as that of the above-described bypass outlet port 55a in the axial direction. When at least a part of the bypass communication port 102 overlaps with the bypass outlet port 55a as seen from the radial direction, the bypass communication port 102 communicates the bypass outlet port 55a and the inside of the flow path 93 through the bypass communication port 102. In the embodiment, the bypass communication port 102 is formed in a round hole. For example, two bypass communication ports 102 are formed at intervals in the circumferential direction.

In the valve cylinder portion 82, a warming communication port 104 passing through the valve cylinder portion 82 in the radial direction is formed at the same position as the above-described warming outlet port 56a in the axial direction. When at least a part of the warming communication port 104 overlaps with the warming outlet port 56a as seen from the radial direction, the warming communication port 104 communicates the warming outlet port 56a and the inside of the flow path 93 through the warming communication port 104. In the embodiment, the warming communication port 104 is formed in a round hole. For example, four warming communication ports 104 are formed at intervals in the circumferential direction.

In the valve cylinder portion 82, an air-conditioning communication port 106 passing through the valve cylinder portion 82 in the radial direction is formed at the same position as the above-described air-conditioning outlet port 66a in the axial direction. When at least a part of the air-conditioning communication port 106 overlaps with the air-conditioning outlet port 66a as seen from the radial direction, the air-conditioning communication port 106 communicates the air-conditioning outlet port 66a and the inside of the flow path 93 through the air-conditioning communication port 106. The air-conditioning communication port 106 is formed as an elongated hole of which a long-length direction is a circumferential direction. In the embodiment, the air-conditioning communication port 106 is formed to straddle the third spoke part 85 in the circumferential direction.

An opening width of the air conditioning communication port 106 in the axial direction is formed to be narrower than an axial interval between the bypass outlet port 55a and the warming outlet port 56a. Therefore, the air-conditioning communication port 106 is configured not to communicate with the bypass outlet port 55a and the warming outlet port 56a. Further, the opening width of the air-conditioning communication port 106 in the axial direction is formed to be smaller than an inner diameter of the above-described air-conditioning outlet port 66a.

As the valve 22 rotates around the axis O, the valve 22 switches communication and shut-off between the inside of the flow path 93 and each of the outlet ports 41b, 55a, 55b and 66a. The cooling water flowing into the casing 21 is distributed to each of the flow paths 11 to 14 through one of the outlet ports which communicates with the communication port. A communication pattern between the outlet port and the communication port can be appropriately set. A layout of the outlet port and the communication port can be changed according to a set communication pattern.

As illustrated in FIG. 3, a seal mechanism 110 which seals between an outer circumferential surface of the valve cylinder portion 82 and an inner circumferential surface of the casing main body 25 is provided in the above-described radiator outlet port 41b. The seal mechanism 110 has a sliding ring 111, a seal ring 112, and a biasing member 113.

The sliding ring 111 is inserted into the radiator outlet port 41b. A radially inner end surface of the sliding ring 111 is slidably in contact with the outer circumferential surface of the valve cylinder portion 82. Further, in the embodiment, the radially inner end surface of the sliding ring 111 is a curved surface formed along a curvature radius of the valve cylinder portion 82.

The seal ring 112 is, for example, a U packing. The seal ring 112 is externally fitted to the sliding ring 111. An outer circumferential surface of the seal ring 112 is slidably in close contact with an inner circumferential surface of the radiator outlet port 41b.

The biasing member 113 is interposed between a radially outer end surface of the sliding ring 111 and the flange portion 43 of the radiator joint 42. The biasing member 113 is, for example, a wave spring. The biasing member 113 biases the sliding ring 111 inward in the radial direction (toward the valve cylinder portion 82).

In addition, a seal mechanism 110 having the same structure as that of the seal mechanism 110 provided in the radiator outlet port 41b is also provided in the bypass outlet port 55a, the warming outlet port 56a and the air-conditioning outlet port 66a. In the embodiment, the seal mechanism 110 provided in the bypass outlet port 55a, the warming outlet port 56a and the air-conditioning outlet port 66a is designated by the same reference numeral as that of the seal mechanism 110 provided in the radiator outlet port 41b, and the description thereof will be omitted.

As illustrated in FIG. 5, a restriction wall portion 120 which closes a part of the flow path 93 is formed in a portion of the valve 22 located between the bypass communication port 102 and the air-conditioning communication port 106 in the axial direction. As illustrated in FIG. 4, the restriction wall portion 120 closes an area of about ⅔ of the above-described flow path 93 in the circumferential direction. In the embodiment, the first flow path 94 and the second flow path 95 among the flow paths 94 to 96 forming the flow path 93 are partitioned into the first end side and the second end side in the axial direction by the restriction wall section 120. As illustrated in FIG. 5, a region of the first flow path 94 and the second flow path 95 on the first end side of the restriction wall section 120 configures a communication flow path 121 directly communicating with the above-described connection flow path 98. On the other hand, a region of the first flow path 94 and the second flow path 95 on the second end side of the restriction wall part 120 configures a return flow path 125 in which the cooling water flowing through the third flow path 96 flows after being returned at portions of the spoke portions (for example, the first spoke part 83 and the third spoke portion 85) on the second end side in the axial direction. The restriction wall portion 120 restricts the flow of the cooling water flowing into the return flow path 125 to the first end side in the axial direction.

As illustrated in FIG. 9, in the embodiment, each of the above-described radiator communication ports 100 communicates with, for example, the communication flow path 121 in the first flow path 94 and the second flow path 95 described above, respectively.

In each of the bypass communication ports 102, for example, one bypass communication port 102 communicates with an inside of the communication flow path 121, and the other bypass communication port 102 communicates with an inside of the third flow path 96.

For example, a part of the air-conditioning communication port 106 communicates with an inside of the return flow path 125, and the remaining portion thereof communicates with the inside of the third flow path 96.

Each of the warming communication port 104, for example, three warming communication ports 104a to 104c communicate with the inside of the return flow path 125. On the other hand, among each of the warming communication ports 104, for example, the remaining one warming communication port 104d communicates with the inside of the third flow path 96. Further, Each of the warming communication ports 104, at least the warming communication port 104 (for example, the warming communication port 104b) which is in a valve-open state at the same timing as the radiator communication port 100 may communicate with the inside of the return flow path 125. In the flow path 93, a flow path cross-sectional area other than the portion closed by the restriction wall portion 120 (flow path cross-sectional area of the third flow path 96) can be changed appropriately when being set to be equal to or larger than an opening area of any of the warming communication ports 104.

[Operation]

Next, an operation of the above-described control valve 8 will be described. In the following description, for example, a flow of the cooling water in the communication pattern illustrated in FIG. 10 will be mainly described. That is, in the communication pattern illustrated in FIG. 10, the radiator outlet port 41b communicates with the inside of the flow path 93 (the communication flow path 121) through the radiator communication port 100. The warming outlet port 56a communicates with the inside of the flow path 93 (the return flow path 125) through the warming communication port 104b. The air-conditioning outlet port 66a communicates with the inside of the flow path 93 (the return flow path 125) through the air-conditioning communication port 106.

As illustrated in FIG. 1, in the main flow path 10, the cooling water delivered by the water pump 3 exchanges heat in the engine 2 and then flows toward the control valve 8. As illustrated in FIG. 5, the cooling water having passed through the engine 2 in the main flow path 10 flows through the inlet port 37a into the connection flow path 98 in the casing 21.

As illustrated in FIG. 6, from the cooling water flowing into the connection flow path 98, some of the cooling water passes through the fail opening 41a and then flows into the EGR outlet port 51a of the EGR port 51. The cooling water flowing into the EGR outlet port 51a passes through the EGR joint 52 and is supplied to the EGR flow path 15. The cooling water supplied to the EGR flow path 15 is returned to the main flow path 10 after heat exchange between the cooling water and the EGR gas is performed in the EGR cooler 7.

As described above, the cooling water supplied to the EGR flow path 15 flows into the connection flow path 98 and then flows into the EGR outlet port 51a without passing through the flow path 93. That is, the cooling water always flows into the EGR outlet port 51a regardless of the rotational position of the valve 22. Thus, for example, when all of the radiator outlet port 41b, the bypass outlet port 55a, the warming outlet port 56a and the air-conditioning outlet port 66a are in a valve-closed state (when the valve 22 is fully closed), the flow of the cooling water from the connection flow path 98 to the flow path 93 is weakened. Therefore, when the valve 22 is fully closed, it is possible to prevent contaminants entering the casing 21 from flowing toward the valve 22 and thus to positively discharge the contaminants from the EGR outlet port 51a. Accordingly, it is possible to prevent the rotation of the valve 22 from being hindered due to contaminants entering between the outer circumferential surface of the valve cylinder portion 82 and the inner circumferential surface of the casing 21 (the circumferential wall portion 31).

Figure 10:
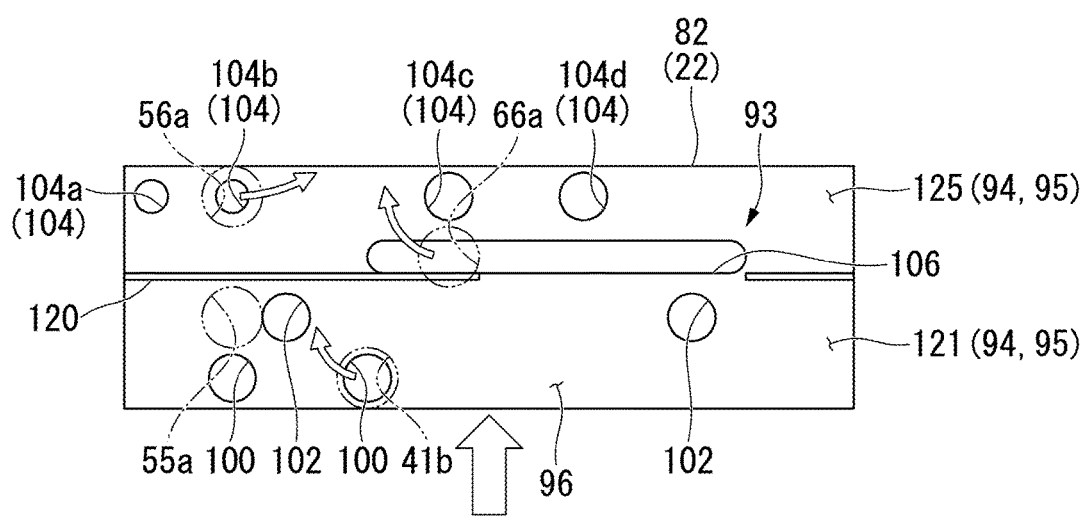
FIG. 10 is a developed view of the valve cylinder portion according to the first embodiment.

Meanwhile, as illustrated in FIG. 5, from the cooling water flowing into the connection flow path 98, the cooling water which has not flowed into the EGR outlet port 51a flows from the first end side in the axial direction into the flow path 93 (the third flow path 96 and the communication flow path 121). The cooling water flowing into the flow path 93 is distributed to each of the outlet ports in a process of flowing in the flow path 93 in the axial direction. Specifically, as illustrated in FIGS. 5 and 10, from the cooling water flowing through the flow path 93, some of the cooling water flows into the radiator communication port 100 at a time point of reaching the radiator port 41. The cooling water flowing into the radiator communication port 100 passes through the radiator outlet port 41b and flows into the radiator communication portion 44b of the radiator joint 42. The cooling water flowing into the radiator communication portion 44b flows in the merging portion 44c and is then supplied to the radiator flow path 11. The cooling water supplied to the radiator flow path 11 is returned to the main flow path 10 after heat exchange with the radiator 4 is performed.

From the cooling water which has passed through the radiator port 41 in the flow path 93, the cooling water flowing in the communication flow path 121 (the first flow path 94 and the second flow path 95) is restricted from flowing to the second end side in the axial direction by the restriction wall portion 120. Meanwhile, as illustrated in FIGS. 8 and 10, from the cooling water which has passed through the radiator port 41 in the flow path 93, the cooling water flowing in the third flow path 96 is returned to the first end side in the axial direction at portions of the spoke portions 83 and 85 on the second end side (a flowing direction of the cooling water is changed).

Therefore, as illustrated in FIGS. 5 and 10, the cooling water flows into the return flow path 125. The cooling water flowing into the return flow path 125 reaches the warming port 56. Then, the cooling water passes through the warming communication port 104b of the warming communication ports 104 which communicates with the warming outlet port 56a and flows into the warming outlet port 56a. The cooling water flowing into the warming outlet port 56a passes through the warming joint 62 and is supplied to the warming flow path 13. The cooling water supplied into the warming flow path 13 is returned to the main flow path 10 after heat exchange with the engine oil is performed in the oil warmer 5.

From the cooling water flowing in the return flow path 125, the cooling water having passed through the warming port 56 reaches the air-conditioning port 66. Then, the cooling water passes through the air-conditioning communication port 106 and flows into the air-conditioning outlet port 66a. The cooling water flowing into the air-conditioning outlet port 66a passes through the air-conditioning joint 68 and is supplied to the air-conditioning flow path 14. The cooling water supplied to the air-conditioning flow path 14 is returned to the main flow path 10 after heat exchange with the air-conditioning air is performed in the heater core 6. Further, in the communication pattern illustrated in FIG. 10, the air-conditioning communication port 106 may communicate with the inside of the third flow path 96. That is, the cooling water may be distributed to the air-conditioning communication port 106 in a process of flowing in the third flow path 96.

Here, in the return flow path 125, the flow of the cooling water to the first end side in the axial direction is restricted by the restriction wall portion 120 (the flowing direction is changed). Therefore, from the cooling water which has flowed into the return flow path 125, the cooling water which has not been supplied to the warming flow path 13 or the air-conditioning flow path 14 stays in the return flow path 125.

The above is the flow of the cooling water in the control valve 8 in the communication pattern illustrated in FIG. 10.

In the control valve 8, the valve 22 is rotated around the axis O to change the communication pattern between the outlet ports and the communication port. By stopping the rotation of the valve 22 at a position corresponding to the communication pattern to be set, the outlet ports and the communication port communicate with each other in the communication pattern corresponding to the stopped position of the valve 22. For example, in the communication pattern illustrated in FIG. 9, only the warming outlet port 56a communicates with the inside of the flow path 93 through the warming communication port 104d. From the cooling water flowing into the flow path 93, the cooling water flowing in the third flow path 96 is supplied from the warming outlet port 56a to the warming flow path 13 through the warming communication port 104d.

In the control valve 8 of the embodiment, when the temperature of the cooling water is excessively increased during occurrence of an abnormality, the cooling water is supplied to the radiator flow path 11 through the fail opening 41a. Specifically, when the temperature of the cooling water flowing into the casing 21 reaches a predetermined temperature or more, the wax of the thermostat 45 thermally expands, and thus the valve body moves in a valve opening direction. Therefore, the fail opening 41a enters the valve-open state. When the fail opening 41a is in the valve-open state, the cooling water in the connection flow path 98 flows into the fail communication portion 44a through the fail opening 41a. The cooling water flowing into the fail communication portion 44a flows through the inside of the merging portion 44c and is then supplied to the radiator flow path 11. Accordingly, regardless of the communication pattern (regardless of the opening and closing of the radiator outlet port 41b), the cooling water can be supplied to the radiator flow path 11.

As described above, in the embodiment, since the thermostat 45 is disposed in a portion of the casing 21 which faces the inlet port 37a in the radial direction, the cooling water flowing into the casing 21 can be effectively delivered to the thermostat 45. Therefore, the temperature sensing performance of the thermostat 45 can be improved. As a result, the fail opening 41a can be rapidly opened and closed according to the temperature of the cooling water regardless of the rotational position of the valve 22 (regardless of a communication state between the radiator outlet port 41b and the radiator communication port 100).

In the embodiment, the EGR outlet port 51a opening in a direction orthogonal to an opening direction of the fail opening 41a is formed in the radiator port 41.

According to this configuration, the cooling water flowing into the casing 21 through the inlet port 37a is in contact with the thermostat 45 and then flows out to the EGR flow path 15 through the EGR outlet port 51a. Therefore, since a flow toward the EGR outlet port 51a can be created around the thermostat 45 in the casing 21, formation of a stagnation point around the thermostat 45 can be prevented. Accordingly, it is possible to further improve the temperature sensing performance of the thermostat 45.

In the embodiment, the radiator joint 42 collectively communicating with the fail opening 41a and the radiator outlet port 41b is welded to the opening end surface of the radiator port 41.

According to the configuration, since the radiator joint 42 collectively communicates with the fail opening 41a and the radiator outlet port 41b, it is possible to reduce the number of components or to reduce welding processing as compared with the case in which separate joints are welded to the fail opening 41a and the radiator outlet port 41b. It is possible to reduce a welding margin of a portion of the radiator joint 42 located between the fail opening 41a and the radiator outlet port 41b as compared with the case in which separate joints are welded to the fail opening 41a and the radiator outlet port 41b. Accordingly, it is possible to reduce the size of the control valve 8 in the axial direction.

Further, in the embodiment, since the inlet port 37a is formed at a position facing the fail opening 41a, the opening end surface of the inlet port 37a can serve as a seating surface when the radiator joint 42 is welded. Therefore, the welding process can be performed effectively.

In the embodiment, since the radiator joint 42 is connected to the radiator flow path 11, the cooling water can be supplied to the radiator 4 through the fail opening 41a when the temperature of the cooling water becomes the predetermined temperature or more. Therefore, the temperature of the cooling water can be rapidly reduced to less than the predetermined temperature.

Second Embodiment

Next, a second embodiment of the present invention will be described. The embodiment is different from the above-described first embodiment in that both ends of the rotating shaft 81 in the axial direction are open to the atmosphere and an EGR joint (first joint) 242 is formed integrally with the cover body 26. Further, in the following description, components the same as those of the above-described first embodiment are designated by the same reference numerals, and description thereof will be omitted.

Figure 11:
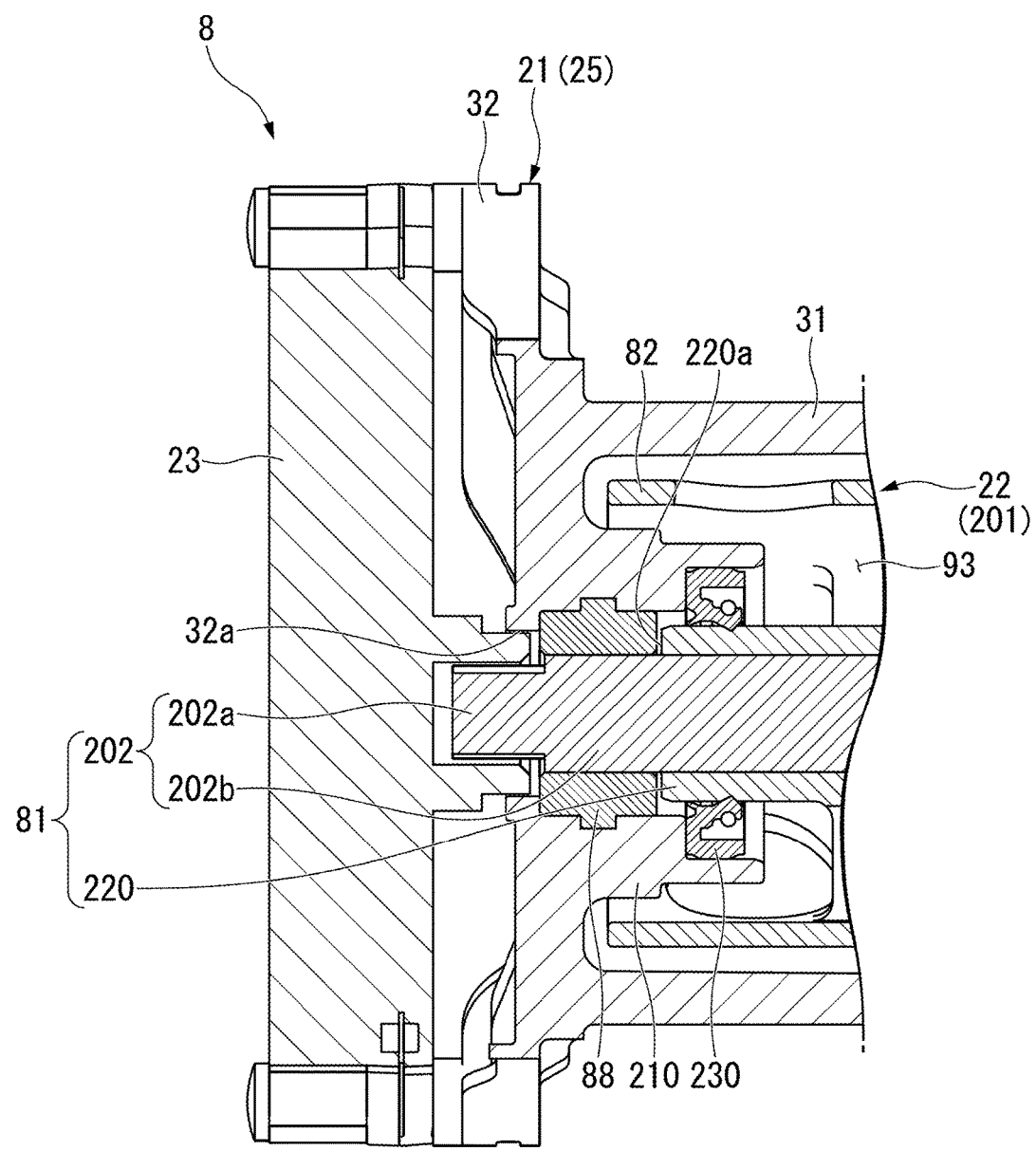
FIG. 11 is an enlarged cross-sectional view illustrating a first end side in an axial direction in a control valve according to a second embodiment.

FIG. 11 is an enlarged cross-sectional view illustrating the first end side in the axial direction in a control valve 8 according to the second embodiment.

As illustrated in FIG. 11, a valve 22 of the embodiment is formed by insert-molding an inner shaft portion 202 inside a valve body 201.

The inner shaft portion 202 is formed of a material (for example, a metal material) having a rigidity higher than that of the valve body 201 (for example, a resin material). The inner shaft portion 202 extends coaxially with the axis O.

A portion of the inner shaft portion 202 on the first end side passes through the bottom wall portion 32 in the axial direction through a through-hole (atmospheric opening portion) 32a. A portion of the inner shaft portion 202 on the first end side is rotatably supported by a first bush (bearing) 88 provided in the above-described bottom wall portion 32. Specifically, on the bottom wall portion 32, a first shaft accommodation wall 210 is formed toward the second end side in the axial direction. The first shaft accommodation wall 210 surrounds the above-described through-hole 32a. The above-described first bush 88 is fitted into the first shaft accommodation wall 210.

A connecting portion 202a is formed on a portion (portion located on an outside with respect to the bottom wall portion 32) of the inner shaft portion 202 located on the first end side in the axial direction with respect to the first bush 88. The connecting portion 202a is formed to be smaller in diameter than a portion of the inner shaft portion 202 other than the connecting portion 202a (large diameter portion 202b). Splines are formed on an outer circumferential surface of the connecting portion 202a. The connecting portion 202a is connected to the above-described drive unit 23 outside the casing 21.

Figure 12:
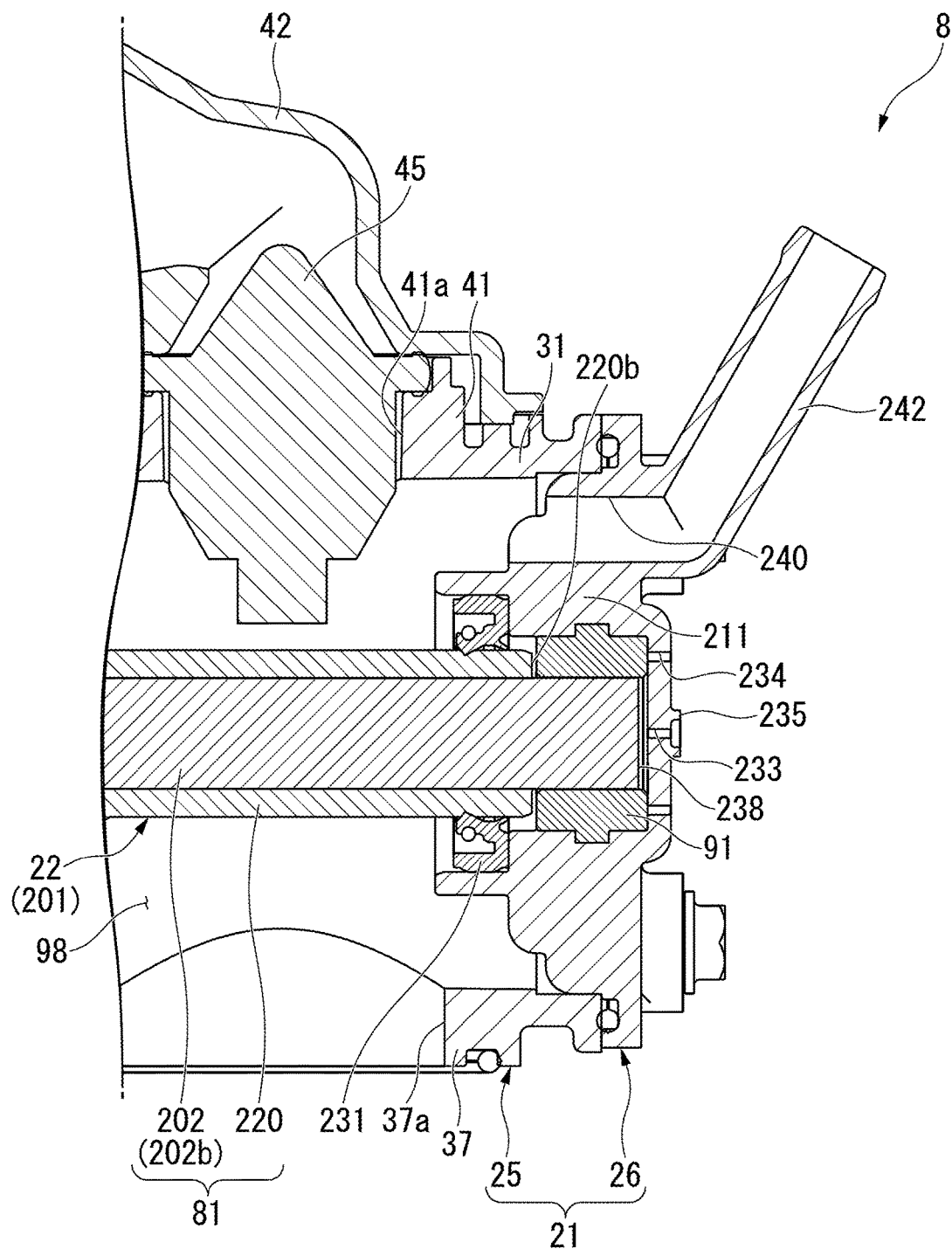
FIG. 12 is an enlarged cross-sectional view illustrating a second end side in an axial direction in a control valve according to the second embodiment.

FIG. 12 is an enlarged cross-sectional view illustrating the second end side in the axial direction in the control valve 8 according to the second embodiment.

As illustrated in FIG. 12, a portion of the inner shaft portion 202 on the second end side is rotatably supported by a second bush (bearing) 91 provided in the above-described cover body 26. Specifically, on the cover body 26, a second shaft accommodation wall 211 is formed toward the first end side in the axial direction. The above-described second bush 91 is fitted into the second shaft accommodation wall 211.

As illustrated in FIG. 11, the valve body 201 surrounds the above-described inner shaft portion 202. The valve body 201 includes an outer shaft portion 220 which covers the inner shaft portion 202, a valve cylinder portion 82 which surrounds the outer shaft portion 220, and spoke portions 83 to 85 (refer to FIG. 4) which connect the outer shaft portion 220 and the valve cylinder portion 82.

The outer shaft portion 220 surrounds an entire circumference of the inner shaft portion 202 in a state in which both ends of the inner shaft portion 202 in the axial direction are exposed. In the embodiment, the outer shaft portion 220 and the inner shaft portion 202 configure the rotating shaft 81 of the valve 22.

Both ends of the rotating shaft 81 in the axial direction are formed in a stepped shape in which an outer diameter thereof gradually reduces from an inner side toward an outer side in the axial direction. Specifically, the outer diameter of the portion of the rotating shaft 81 on the first end side reduces in the order of the outer shaft portion 220, the large diameter portion 202b of the inner shaft portion 202 and the connecting portion 202a thereof. An end surface 220a of the outer shaft portion 220 on the first end side in the axial direction is configured to be capable of being in contact with the above-described first bush 88 from the second end side in the axial direction.

Meanwhile, as illustrated in FIG. 12, the outer diameter of the portion of the rotating shaft 81 on the second end side reduces in the order of the outer shaft portion 220 and the large diameter portion 202b of the inner shaft portion 202. An end surface 220b of the outer shaft portion 220 on the second end side in the axial direction is configured to be capable of being in contact with the above-described second bush 91 from the first end side in the axial direction. That is, the bushes 88 and 91 of the embodiment support the rotating shaft 81 in the radial direction and the axial direction.

As illustrated in FIG. 11, in the above-described first shaft accommodation wall 210, a first seal ring 230 is provided on the second end side in the axial direction with respect to the first bush 88. The first seal ring 230 seals between an inner circumferential surface of the first shaft accommodation wall 210 and an outer circumferential surface of the rotating shaft 81 (the outer shaft portion 220).

A portion of the first shaft accommodation wall 210 located on the first end side in the axial direction with respect to the first seal ring 230 is open to the atmosphere through the through-hole 32a. Therefore, atmospheric pressure is applied to a first end side portion (portion of the rotating shaft 81 located on the first end side in the axial direction with respect to a seal portion (the outer shaft portion 220) of the first seal ring 230) of the rotating shaft 81 through a gap between the drive unit 23 and the bottom wall portion 32, the through-hole 32a, a gap between the first shaft accommodation wall 210 and the first bush 88, or the like. At this time, in the portion of the rotating shaft 81 on the first end side, a pressure receiving surface in the axial direction is an end surface which faces the first end side of each of the connecting portion 202a, the large diameter portion 202b and the outer shaft portion 220.

Meanwhile, as illustrated in FIG. 12, in an inside of the above-described second shaft accommodation wall 211, a second seal ring 231 is provided on a portion of the second bush 91 on the first end side in the axial direction. The second seal ring 231 seals between an inner circumferential surface of the second shaft accommodation wall 211 and the outer circumferential surface of the rotating shaft 81 (the outer shaft portion 220).

A through-hole (atmospheric opening portion) 233 passing through the cover body 26 in the axial direction is formed in the cover body 26. Specifically, the through-hole 233 is provided at a position of the cover body 26 which faces an axial end surface 238 coaxially with the axis O. Further, an outer through-hole 234 which is a mark of a pin gate at the time of resin molding is formed in a portion of the cover body 26 which is located outside the through-hole 233 in the radial direction. In the embodiment, a plurality of outer through-holes 234 are formed at intervals in the circumferential direction around the axis O. An inner diameter of each of the above-described through-holes 233 and 234 is preferably smaller than a gap between the casing 21 and the valve cylinder portion 82. Therefore, even when the contaminants enter the casing 21 through the through-holes 233, 234, the contaminants can be prevented from entering between the casing 21 and the valve cylinder port 82, and thus the rotation of the valve 22 is prevented from being hindered. However, the number, shapes, positions and so on of the through-holes 233, 234 can be appropriately changed in design.

In the second shaft accommodation wall 211, a space which is defined on the second end side in the axial direction with respect to a seal portion between the rotating shaft 81 and the second seal ring 231 is open to the atmosphere through the through-hole 233. Therefore, atmospheric pressure is applied to a portion of the rotating shaft 81 on the second end side (a portion of the rotating shaft 81 on the second end side in the axial direction in relation to the seal portion (the outer shaft portion 220) of the second seal ring 231) through the through-hole 233. That is, in this embodiment, a pressure difference is not generated in the pressures acting on both ends of the rotating shaft 81. Further, the through-hole 233 is not limited to being on the same axis as the axis O but may be formed at a position at least partly facing the axial end surface 238 of the cover body 26 in the axial direction and may communicate with a portion defined by the cover body 26, the second bush 91 and the shaft end surface 238.

On the second end side of the rotation shaft 81, the pressure receiving surface in the axial direction is an end surface which faces the second end side of each of the large diameter portion 202b and the outer shaft portion 220. In the embodiment, it is preferable that areas obtained by projecting the pressure receiving surfaces in the axial direction are equal to each other. However, the area of each pressure-receiving surface can be appropriately changed.

A restriction wall 235 protruding toward the second end side in the axial direction is formed on a portion of the cover body 26 located on a radial inner side with respect to the second shaft accommodation wall 211. The restriction wall 235 surrounds a circumference of the above-mentioned through-hole 233.

An EGR outlet port 240 is formed in a portion of the cover body 26 which is located radially closer to the radiator port 41 than the restriction wall 235. The EGR outlet port 240 passes through the cover body 26 in the axial direction. Also in the embodiment, the EGR outlet port 240 intersects (orthogonally) an opening direction (radial direction) of the fail opening 41a. The EGR outlet port 240 at least partly overlaps with the thermostat 45 in a front view as seen from the axial direction.

In the cover body 26, an EGR joint 242 is formed on an edge of an opening of the EGR outlet port 240. The EGR joint 242 is formed in a cylindrical shape which extends radially outwards toward the second end side in the axial direction. The EGR joint 242 connects the EGR outlet port 240 to an upstream end of the EGR flow path 14 (refer to FIG. 1). In the embodiment, the EGR joint 242 is formed integrally with the cover body 26.

In the embodiment, in addition to the same operational effects as those of the above-described first embodiment, the following operational effects are achieved.

That is, since the EGR joint 242 is integrally formed with the cover body 26, the number of components can be reduced or the welding processing can be reduced as compared with the case in which the EGR joint is separately installed (welding or the like) at the casing main body 25 or the cover body 26.

The EGR joint 242 (the EGR outlet port 240) is disposed on a side opposite to the flow path 93 in the axial direction with the inlet port 37a interposed therebetween. Therefore, when the valve 22 is fully closed, it is possible to more reliably prevent contaminants entering the casing 21 from flowing toward the valve 22 and to positively discharge the contaminants from the EGR outlet port 240.

In the embodiment, since both ends of the rotating shaft 81 in the axial direction are open to the atmosphere, a pressure difference is not generated in the pressures acting on both ends of the rotating shaft 81. Therefore, it is easy to set the same axial loads to act on each pressure receiving surface of the rotating shaft 81 as compared with the case in which the pressures acting on each pressure receiving surface are different from each other, for example, as in a configuration in which one end of the rotating shaft 81 is disposed in the cooling water. Accordingly, it is possible to minimize pressing of the rotating shaft 81 toward a low pressure side in the axial direction.

Therefore, in the embodiment, for example, the following effects are obtained.

(1) It is possible to prevent the valve 22 from being pressed toward the drive unit 23 and to minimize an increase in a load torque of the drive unit 23. Therefore, it is possible to prevent an increase in output and size of the drive unit 23.

(2) Since a load in the axial direction transmitted from the rotating shaft 81 to the casing 21 or the drive unit 23 can be reduced, it is not necessary to provide a thrust bearing separately from a radial bearing. Therefore, it is possible to reduce the number of components and to minimize an increase in size of the control valve in the axial direction. Even when the thrust bearing is provided separately from the radial bearing, it is possible to select a simple thrust bearing with a low cost and thus to reduce a cost of the control valve 8.

(3) Since a positional deviation of the valve 22 from the casing 21 in the axial direction can be prevented, the outlet port formed in the casing 21 and the communication port of the valve 22 can be set at desired positions in the axial direction. Thus, desired flow rate characteristics can be obtained.

Particularly, in this embodiment, since the pressure receiving surfaces of the rotary shaft 81 are the same as each other, the above-described effects can be obtained to a more significant extent.

Although the preferred embodiments of the present invention have been described above, the present invention is not limited to the embodiments. Additions, omissions, substitutions and other changes in the configuration are possible without departing from the scope of the present invention. The present invention is not limited by the foregoing description but is limited only by the scope of the appended claims.

For example, in the above-described embodiment, the configuration in which the control valve 8 is mounted in the cooling system 1 of the engine 2 has been described, but the present invention is not limited to the configuration, and the control valve 8 may be mounted in other systems.

In the above-described embodiment, the configuration in which the cooling water flowing into the control valve 8 is distributed to the radiator flow path 11, the bypass flow path 12, the warming flow path 13, the air-conditioning flow path 14 and the EGR flow path 15 has been described, but the present invention is not limited to the configuration. The control valve 8 may be configured to distribute the cooling water flowing into the control valve 8 into at least two flow paths.

A layout, a type, a shape or the like of each communication port and each outlet port can be appropriately changed.

In the above-described embodiment, the configuration in which each joint is welded to the opening end surface of each flow port, but the present invention is not limited to the configuration, and each joint may be fixed to the opening end surface of each flow port by other methods (for example, adhesion, fastening, and so on).

In the above-described embodiment, for example, the configuration in which the inlet port, each communication port and each outlet port pass through the valve cylinder portion 82 and the casing 21 in the radial direction have been described, but the present invention is not limited to the configuration. For example, each communication port and each outlet port may pass through the valve cylinder portion 82 and the casing 21 in the axial direction, respectively.

In the above-described embodiment, the configuration in which the fail opening 41a communicates with the radiator flow path 11 has been described, but the present invention is not limited to such a configuration.

In the above-described embodiment, the first outlet port is described as the radiator outlet port 41b, but the present invention is not limited to the configuration.

In addition, it is possible to appropriately replace elements in the above-described embodiments with well-known elements without departing from the scope of the present invention, and the modified embodiments described above may be appropriately combined.

What is claimed is:

1. A control valve comprising:
a cylindrical casing having an inlet port and a first outlet port for a fluid, and
a valve accommodated in the casing to be rotatable around an axis extending in an axial direction of the casing and having a flow path communicating with the inlet port to allow the fluid to flow therethrough, wherein
a first communication port communicating with the flow path and the first outlet port according to a rotational position of the valve is formed in the valve, and
a fail opening configured to be opened and closed by a thermostat is formed in a portion of the casing so as to face the inlet port in a radial direction of the casing,
wherein a second outlet port configured to open in a direction intersecting the opening direction of the fail opening is formed in a portion of the casing adjacent to the fail opening.

2. The control valve according to claim 1, wherein
the casing includes a bottomed cylindrical casing main body and a cover body configured to close an opening of the casing main body,
the fail opening radially passes through a portion of the casing main body located close to the cover body in the axial direction,
the second outlet port passes through the cover body in the axial direction, and
a first joint which connects between a heat exchanger disposed outside the casing and the second outlet port is integrally formed with the cover body.

3. The control valve according to claim 1, wherein
the valve includes a rotating shaft rotatably supported by the casing and a valve cylinder portion configured to surround a part of the rotating shaft in the axial direction, the valve cylinder portion configured to partition and define the flow path between the valve cylinder portion and the rotating shaft and in which the first communication port is formed,
a connection flow path configured to communicate the inlet port and the flow path with each other is formed at a position in the casing which avoids the valve cylinder portion in the axial direction, and
the second outlet port directly communicates with the connection flow path.

4. The control valve according to of claim 1, wherein
the valve includes a rotating shaft of which both ends in the axial direction are rotatably supported by the casing via a bearing and a valve cylinder portion configured to surround the rotating shaft, the valve cylinder portion configured to partition and define the flow path between the valve cylinder portion and the rotating shaft and in which the first communication port is formed,
a seal ring is disposed between a portion of the casing positioned inside in the axial direction with respect to the bearing and the rotating shaft, and
an atmospheric opening portion which opens to the atmosphere is formed at a portion of the casing positioned outside in the axial direction with respect to the seal ring.

5. The control valve according to claim 1, wherein
the first outlet port and the fail opening are formed side by side in the casing, and
an outer surface of the casing has a welding portion which surrounds the first outlet port and the fail opening and on which a second joint collectively communicating with the first outlet port and the fail opening is welded.

6. The control valve according to claim 5, wherein the second joint is connected to a radiator of a vehicle.

* * * * *